US007787152B2

(12) United States Patent
Haas et al.

(10) Patent No.: US 7,787,152 B2
(45) Date of Patent: Aug. 31, 2010

(54) COPY DETECTION SYSTEM USING CORRELATIONS OF COPY DETECTION PATTERNS

(75) Inventors: Bertrand Haas, New Haven, CT (US); Claude Zeller, Shelton, CT (US); Zhijie Xu, Troy, NY (US)

(73) Assignee: Pitney Bowes Inc., Stamford, CT (US)

( * ) Notice: Subject to any disclaimer, the term of this patent is extended or adjusted under 35 U.S.C. 154(b) by 1148 days.

(21) Appl. No.: 11/240,889

(22) Filed: Sep. 30, 2005

(65) Prior Publication Data

US 2007/0076239 A1    Apr. 5, 2007

(51) Int. Cl.
*G06K 9/00*    (2006.01)
(52) U.S. Cl. ................. 358/3.28; 358/1.14; 382/215
(58) Field of Classification Search ............... 358/3.28, 358/1.14; 382/100, 215
See application file for complete search history.

(56) References Cited

U.S. PATENT DOCUMENTS

| 6,768,807 | B1 | 7/2004 | Muratani | 382/100 |
| 7,630,511 | B2 * | 12/2009 | Zhao et al. | 382/100 |
| 2005/0025338 | A1 * | 2/2005 | Zhao et al. | 382/100 |
| 2006/0002583 | A1 * | 1/2006 | Reed et al. | 382/100 |
| 2006/0109515 | A1 * | 5/2006 | Zhao et al. | 358/3.28 |

FOREIGN PATENT DOCUMENTS

| EP | 1416440 A2 | 5/2004 |
| WO | 03/098540 A1 | 11/2003 |
| WO | 2005/067586 A2 | 7/2005 |

* cited by examiner

*Primary Examiner*—Twyler L Haskins
*Assistant Examiner*—Kent Yip
(74) *Attorney, Agent, or Firm*—George M. Macdonald; Angelo N. Chaclas (57) ABSTRACT

Systems and methods for detecting copies of documents are described. In one example, a system and method for detecting copies of documents utilizes multiple correlations of original and scanned copy detection patterns. The system captures a CDP that may be skewed or improperly sized. The system also retrieves or reconstitutes the expected CDP. In order to provide a more reliable comparison and without manipulating the captured CDP, the system manipulates the orientation or rotation and resolution or size of the retrieved or reconstituted CDP to register it with the captured CDP. Then the system performs a first correlation to determine if the captured CDP indicates the correct document identification and then if necessary, a second correlation to determine authentication such as by performing a 1 pixel shift multiple autocorrelation comparison of the two CDPs.

16 Claims, 4 Drawing Sheets

COPY DETECTION SYSTEM USING CORRELATIONS OF COPY DETECTION PATTERNS

CROSS REFERENCE TO RELATED APPLICATIONS

The present application is related to co-pending, commonly owned U.S. patent application Ser. No.: 11/011,829, filed Dec. 14, 2004, entitled METHOD AND SYSTEM FOR PRINTING AN ORIGINAL IMAGE AND FOR DETERMINING IF A PRINTED IMAGE IS AN ORIGINAL OR HAS BEEN ALTERED, which is incorporated herein by reference.

FIELD OF THE INVENTION

The present invention relates to systems and methods for detecting copies of documents, and in particular to systems and methods for detecting copies of documents using multiple correlations of original and scanned copy detection patterns.

BACKGROUND OF THE INVENTION

Digital technology has become pervasive in the creation and distribution of many types of media. For example, valuable audio and video content is distributed in digital form both electronically and embodied in a carrier media. Similarly, documents may be created and distributed in digital form both electronically and embodied in a carrier media such printed paper. Content owners may wish to provide identification, authentication and non-repudiation for certain documents transmitted in electronic form. Furthermore, many valuable documents are produced and distributed in paper form. Various technologies are now readily available for making high-quality copies of documents. As a result, unauthorized copying and counterfeiting of documents such as bank notes, checks, and identification documents is a serious concern.

Moreover, the pervasive nature of the Internet allows easier and anonymous access to sources of counterfeit documents. There are many image capture systems such as CCD cameras, drum scanners, flatbed scanners and other capture/scanning systems that are readily available and that provide excellent reproduction accuracy and precision. Similarly, general-purpose personal computers have the capacity to run powerful digital media editing software that is also readily available. Furthermore, very accurate and precise monochrome and color printing systems are readily available for outputting such unauthorized copies and counterfeit documents.

Accordingly, document creators and distributors must seek out more advanced technologies to thwart the efforts of such counterfeiters. Otherwise, members of society could not rely on the identity, authenticity and purported source of valuable documents. Several technologies are available to thwart the unauthorized copying or counterfeiting of documents including UV ink, holograms, and OVDs (Optical Variable Devices). Such techniques may be relatively inexpensive, but may rely on human operator judgment and may not be reliable. Documents may also be tagged using RFID or DNA tagging technologies. Such techniques may be reliable, but may be relatively expensive.

Several types of physical document copy detection systems are known including copy detection patterns (CDPs) that may be placed in a particular region of a document reserved for the purpose. Furthermore, several copy detection systems are known that utilize visible and invisible digital watermarks that are applied to an actual image or document. Commercially available systems include those available from Digimarc Corporation of Beaverton, Oreg. and Mediasec Technologies, LLC of Providence, R.I. For example, a system for using a continuously varying tone graphic field for copy detection is described in U.S. Pat. No. 6,454,174 entitled Method for Reading Electronic Tickets, issued Sep. 24, 2002 to Ronald P. Sansone. Furthermore, U.S. Pat. No. 6,782,116 B1 issued Aug. 24, 2004 to Jian Zhao, et al. describes watermark systems and is titled Apparatus and Methods for Improving Detection of Watermarks in Content that has Undergone a Lossy Transformation.

Digital watermark systems have been typically used in the so called electronic world in which a digital electronic file such as an image file in a particular format or a digital music or other media content format is watermarked and intended to be sent to a digital file player. For example, a digital file representing a source image may be represented digitally as a two dimensional array of 256 level gray-scale pixels. In such a situation, the source image may be considered a grayscale cover image that may be processed to reduce its range to grayscale values of 20-235. A watermark source image of the same dimensions may be created having random gray levels. The watermark source image may then be reduced to a grayscale range of 0-40 (the strength of the watermark) and then shifted to a range of −20 to 20 to create a watermark image. Thereafter, the cover image and watermark image can be added to create a watermarked source image. Such a watermark can later be retrieved from the image for various purposes.

While digital watermarks are sometimes used to secure physical manifestations of digital content such as printed images, copy detection patterns are also used for securing physical representations of digital content such as a printed document. In many implementations, a copy detection pattern (CDP) consists of a rectangle or other shaped area filled with pixels of random gray levels that are intended for a reserved printed area of the physical document. Copy-detection patterns (CDPs) have been described that include a digital image generated pseudo-randomly using a cryptographic secret key. Such patterns are described as being designed to be sensitive to any scanning and printing process and as based on an information loss principle. For example, every time an image is printed or scanned, some information is lost about the original digital image due to physical characteristics of the printing and scanning systems. CDPs have been demonstrated using different printing technologies (offset, laser printer, dye sublimation, etc.) and different image capture/scanning technologies (photocopy, high resolution scanners, etc). Certain copy detection patterns may be thought of as a digital watermark of maximum strength and without a cover image.

However, traditional copy detection patterns have been described that manipulate a captured CDP that is retrieved from a hard copy using a scanner or other image capture device. Furthermore, CDP systems have been described that provide a copy detection determination based upon a single correlation of an expected CDP with a captured CDP. Accordingly, there is a need for a copy detection pattern based copy detection system that does not manipulate a captured CDP. Furthermore, there is a need for a copy detection pattern based copy detection system that provides a copy detection determination based upon more than one correlation of an expected CDP with a retrieved CDP.

SUMMARY OF THE INVENTION

The present invention provides a systems and methods for detecting copies of documents, and in certain embodiments to systems and methods for detecting copies of documents using multiple correlations of original and scanned copy detection patterns.

In one embodiment, the system captures a CDP that may be skewed or improperly sized. The system then retrieves or reconstitutes the expected CDP having the correct orientation and resolution (size). In order to provide a more reliable comparison and without manipulating the captured CDP, the system manipulates the orientation or rotation and resolution or size of the retrieved or reconstituted CDP to more closely correspond to the skewed orientation and incorrect size of the captured CDP.

In another embodiment, the system then performs a first simple correlation to determine if the captured CDP indicates the correct document identification and then if necessary, a second correlation to determine authentication such as by performing a 1 pixel shift autocorrelation comparison of the two CDPs. In yet further embodiments, the authentication correlation may include 3 or more autocorrelations by such as by performing 1 pixel shift in several directions.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Copy detection systems that use copy detection patterns are commercially available from at least Mediasec Technologies, LLC. Illustrative embodiments described herein provide alternative copy detection pattern copy detection systems and methods. Copy detection systems rely on the lossy transformations presented by the physical mechanisms involved with making an unauthorized copy. For example, in the printing and scanning process, even the most technologically advanced hardware systems will introduce some distortion or error into the process. In the scanning or image capture process, a typical scanner grid is usually not aligned exactly on the printed grid of the scanned document. It would usually scan a mix of two to four pixels of the original document thereby mixing the gray levels of those pixels. Similarly, printing technologies introduce error. In an ink jet printing system, ink usually spreads from the intended pixel to neighboring pixels. In a thermal printing process, thermal history and neighbor heat effects cause a mixing of gray levels among neighboring pixels.

It is an object of the present application to describe copy detection pattern based copy detection systems that do not manipulate a captured CDP. It is a further object of the present application to describe copy detection pattern based copy detection systems that provide a copy detection determination based upon more than one correlation of an expected CDP with a retrieved CDP.

Figure 1:
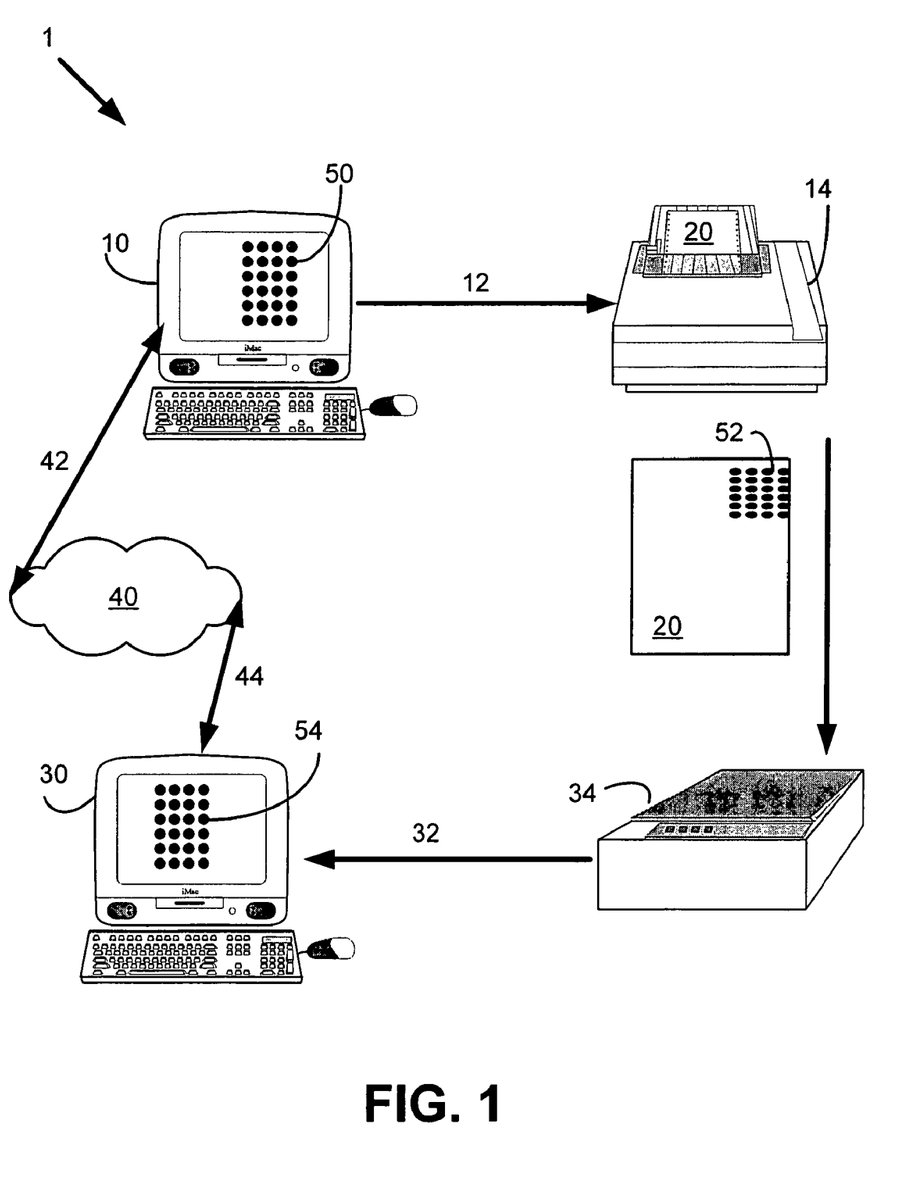
FIG. 1 is a block diagram of a system for detecting copies of documents according to an illustrative embodiment of the present application.

Referring to FIG. 1 a block diagram of a system for detecting copies of documents 1 according to an embodiment of the present application is shown. A document and original digital CDP 50 creation system 10 is connected to a printer 14 using communications channel 12 such as a USB cable. The system applies a seal (the Copy Detection Pattern—or CDP) on a document. The CDP creation personal computer 10 creates an original digital CDP that can be created using several algorithms.

In this embodiment, the original digital CDP 50 is created using the SHA-1 algorithm with a key and information from the underlying document that is to be protected. The resulting CDP is a rectangle filled with pixels of pseudo-random gray levels. Alternatively, other shapes and algorithms may be used. The digital CDP is then included somewhere in the digital document 20 and typically in an area reserved on the document. The document 20 is then printed with a given type of printer 14 (the official printer). In an alternative, the original document already exists and is placed in the printer 14 so that the printed CDP 52 can be applied. For example, the CDP may be created as a hash of the document and may be protected with a secret key. See U.S. patent application Ser. No. 11/011,829.

The printer 14 may be used to print the entire contents of document 20 or just the printed CDP 52. The printed CDP 52 will typically occupy a dedicated portion of the document 20 such as the top right corner depicted as the region of interest for the CDP. The CDP protected document 20 then enters circulation until reaching the verification scanner 34. Unfortunately, while in circulation, unscrupulous individuals might make an unauthorized copy of the document 20. Such fraudulent copies are usually scanned and reprinted with high quality devices. The document (or its unauthorized copy) is then scanned at the verification system with a given type of scanner 34 (the official scanner) and the image of the scanned CDP 54 is analyzed to detect whether it (and therefore the whole document or the part of the document to be protected if the CDP was created as a hash of a portion of the document) has been copied or not.

The scanner 34 is connected to the verification personal computer 30 using communications channel 32 such as a USB cable. In an alternative, the scanner is an image capture device such as a CCD camera. The personal computers 10, 30 are DELL, PENTIUM 4 based computers running WINDOWS XP. The applications described herein are programmed in MATLAB, but could alternatively be programmed in a general-purpose high-level computer language or assembly code. Other known computing systems, programming systems, communications systems and security systems may be utilized.

The processing applications described herein utilize statistical correlation algorithms between two images. For clarity and simplicity, we describe the simplest correlation coefficient formula (called the Pearson formula), which describes a 2-variable first order correlation: $C=(E(X*Y)-E(X)*E(Y))/(s(X)*s(Y))$, where $E(X)$ is the expectation of X and $s(X)$ is the variance of X.

The personal computer 10 runs the original CDP creation program and the verification computer 30 runs the CDP comparison copy detection program. It is assumed that the original digital CDP 50 is available at the verification computer 30. The original digital CDP 50 could be transmitted from the CDP creation computer 10 to the verification computer 30 using communication channels 42, 44 and network 40. Network 40 comprises the Internet, but other networks may be used. Alternatively, the original CDP 50 could be sent through an intermediary such as a trusted third party (not shown). In yet another alternative, the key used to generate CDP 50 may be transmitted to the verification computer 30 or otherwise recovered such as by recovering the key from elsewhere on document 20. In such an alternative, the verification computer 30 would reconstitute the original CDP 50 locally using the recovered key. In the embodiment described using the SHA-1 digital signature algorithm, the key would be used with the contents of document 20 to reconstitute the original CDP 50.

Figure 2:
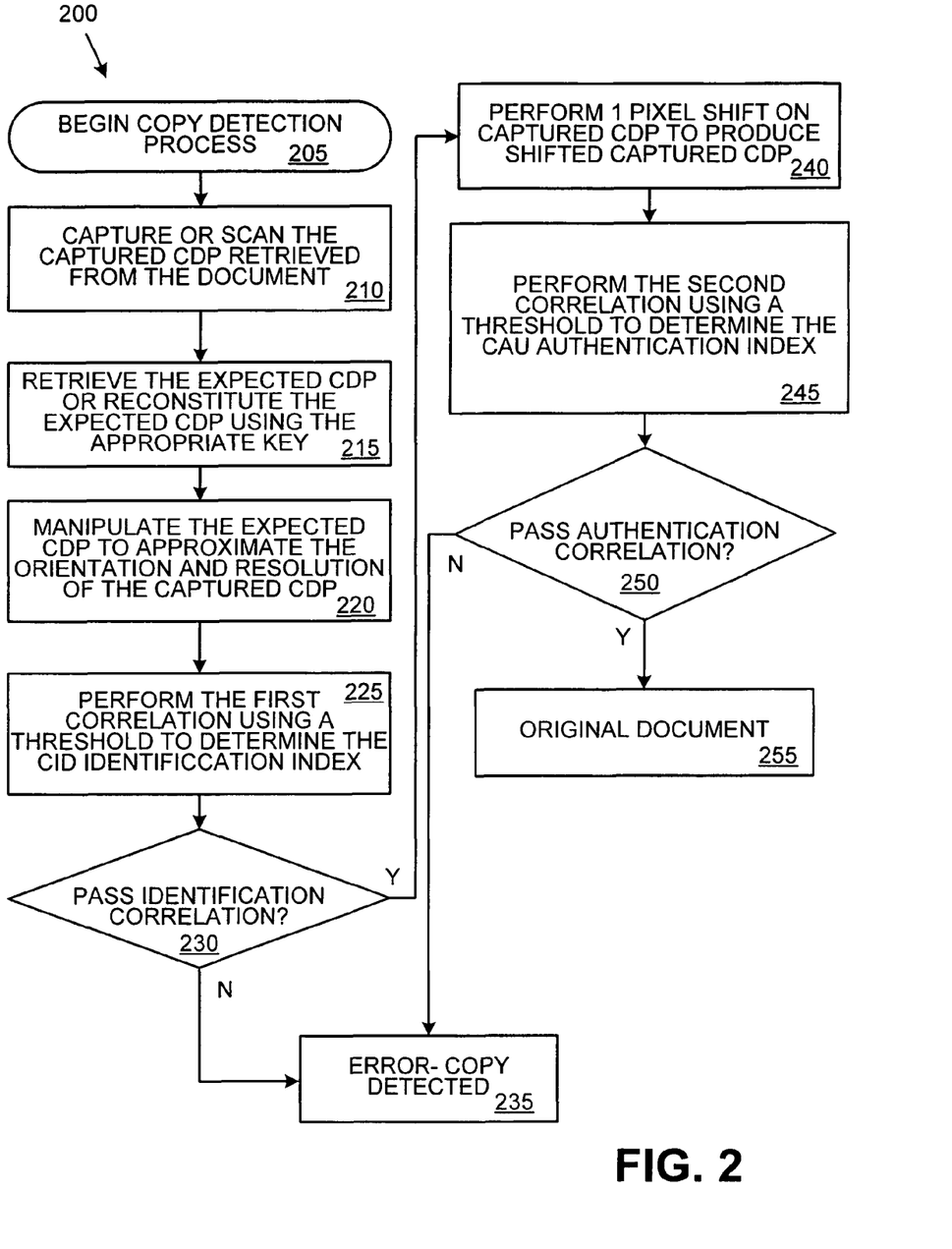
FIG. 2 is a flowchart showing a method for detecting copies of documents according to an illustrative embodiment of the present application.

Referring to FIGS. 1 and 2, an illustrative embodiment is described. The copy detection method described utilizes two steps. First, the system determines an identification index to determine whether or not the scanned CDP is the CDP that is expected. The initial CDP is spatially transformed (mainly by resizing and rotation) to register (that is, to correspond pixel to pixel) to the scanned CDP. Then a correlation coefficient CID (between the 2 CDP images) is computed. A previously empirically determined threshold is then applied to the CID to determine if the scanned CDP passes the identification test.

Secondly, if necessary, the system determines an authentication index to determine whether or not the scanned CDP is a copy. The image of the scanned CDP is correlated with an image of itself shifted by one pixel. The image of the scanned CDP is preferably not registered. A coefficient of correlation CAU is then computed. A previously empirically determined threshold is then applied to the CAU to determine if the scanned CDP passes the authentication test.

The system utilized two major subsystems. The first subsystem is the CDP creation program that creates an original digital CDP and the second subsystem is the CDP copy detection program that performs the copy detection algorithm using the scanned CDP and the original digital CDP data.

In the CDP creation program, the system creates an array of random gray levels. It is not necessary to know the pseudo random generator that is utilized in a CDP application to use the system. In this illustrative embodiment, the known SHA-1 algorithm is applied to some of the data of the original document to provide copy protection, but any kind of pattern (pseudo random or not) could alternatively be used.

Certain CDP systems may perform transformations on the scanned CDP data, but such transformations may incur a loss of valuable information and may compromise valuable test data. It is not necessary to know the CDP copy detection algorithm that is utilized in a commercial CDP application to use the system. However, the effectiveness of such an algorithm can be empirically measured. In the CDP copy detection program described here, the scanned CDP is kept intact. All the transformations necessary to register the scanned CDP with the initial original digital CDP (in the identification step) are done to the initial CDP. No transformation is necessary in the authentication step.

The identification subprogram comprises three substeps. The first substep is transforming the image of the initial CDP into an image QI so that it registers optimally with the image SI of the scanned CDP. The second substep is applying a transformation to QI that mimics the distortion of the print scan process. The illustrative method described here utilizes a linear filter, but any suitable transformation could be applied. The result of this transformation is an image RI. The order registration of the first substep followed by the print-scan emulation of the second substep can actually be interchanged. The third substep is computing the correlation coefficient Cid of RI and SI. This is done with the well known formula:

$$Cid=(E(RI.*SI)-E(RI)*E(SI))/(s(RI)*s(SI)).$$

The authentication subprogram comprises two substeps. The first substep is creating a one-pixel shift image PI of the scanned image SI. The second substep is computing the correlation coefficient Cau of PI and SI (shown here using a simple correlation, but multiple correlations may be used):

$$Cau=(E(PI.*SI)-E(PI)*E(SI))/(s(PI)*s(SI)).$$

Many originals and associated copies of CDPs were tested and according to the values of CID and CAU that were returned, a reasonably straightforward decision protocol was implemented, but other more complicated protocols may be used.

A first threshold T1 was selected based upon empirical data for the value of CID at the end of the identification step. If CID>T1, then the scanned CDP will fail and be considered a copy. Accordingly, the authentication step does not need to be performed. If CID<T1, the CDP passes the identification test and the authentication step is performed.

A second threshold T2 was selected based upon empirical data for the value of CAU at the end of the authentication step. If CAU>T2, then the scanned CDP fails and the associated document is considered a copy. If CAU<T2, then the scanned CDP passes and the associated document is considered an original.

Referring to FIG. 2, a flowchart showing a method for detecting copies of documents 200 according to an embodiment of the present application is shown. In step 205, the copy detection process begins. In step 210, the system captures or scans a captured CDP that is retrieved from the document being verified. In step 215, the system retrieves the expected CDP or reconstitutes the expected CDP using the appropriate key. As can be appreciated, there are several possible methods for gaining access to the original digital CDP data including using a third party intermediary. In step 220, the expected CDP (original digital CDP data) is manipulated to approximate the orientation and resolution of the captured CDP using a registration process. In a possible intermediary step, QI is converted to RI.

In step 225, the system performs the first correlation using the registered expected CDP, the captured CDP and a threshold to determine the CID identification index using autocorrelation. In step 230, the system determines whether the scanned CDP passed the identification correlation. If it did not pass, the scanned CDP failed and control passes to step 235 to process the error condition. If it did pass, control passes to step 240. In step 240, the system performs a 1 pixel shift on the captured CDP to produce shifted captured CDP. The shifted captured CDP is not registered. In step 245, the system performs the second correlation using the shifted captured CDP, the captured CDP to determine the CAU authentication index using either a simple or multiple autocorrelation.

In step 250, the system determines whether the scanned CDP passed the authentication correlation. If it did not pass, the scanned CDP failed and control passes to step 235 to process the error condition. If it did pass, control passes to step 255 and the document is verified as an original document.

Several comparison examples of the embodiment described above were performed to determine effectiveness with differing physical configurations and comparisons to a commercially available copy detection pattern based copy detection system were performed as shown in the following tables. In the experiments described by the following tables, the following parameters were used along with a Personal Computer (such as a DELL PENTIUM 4 PC) and a Canon LIDE 30 scanner at 300 or 400 dpi.

Experiment 1: The CDP key 1 used was 1234598765. The Original was printed using a MITSUBISHI P91D thermal printer on thermal paper. Experiment 2: The CDP key 2 used was 1234556789. The Original was printed using a MITSUBISHI P91D thermal printer on thermal paper. Experiment 3: The CDP key 2 used was 1234556789. The Original was printed using an EPSON stylus C82 ink jet printer on HP photo paper. The cross area denotes the percentage of false negative results and false positive results in the particular configuration.

TABLE 1

| | | Commercial System (test value) | | Correlation Coefficient - CID (Identification Index) | | |
|---|---|---|---|---|---|---|
| Experiment # | | Original | Copy | Cross Area | Original (key 2) | Original (key 1) | Cross Area |
| 1 | Mean | 79.44 | 77.10 | 1.79% | −0.113 | 0.602 | 0 |
| | Std | 0.68 | 0.32 | | 0.009 | 0.091 | |
| 2 | Mean | 79.95 | 77.24 | 0.73% | 0.630 | −0.045 | 0 |
| | Std | 0.51 | 0.50 | | 0.041 | 0.064 | |
| 3 | Mean | 76.61 | 74.58 | 2.73% | 0.502 | −0.028 | 0 |
| | Std | 0.47 | 0.45 | | 0.094 | 0.071 | |

As can be appreciated from the experimental results described in TABLE 1, the identification index of the described embodiment provided no indecisive cross area, while the commercial system did.

Figure 3:
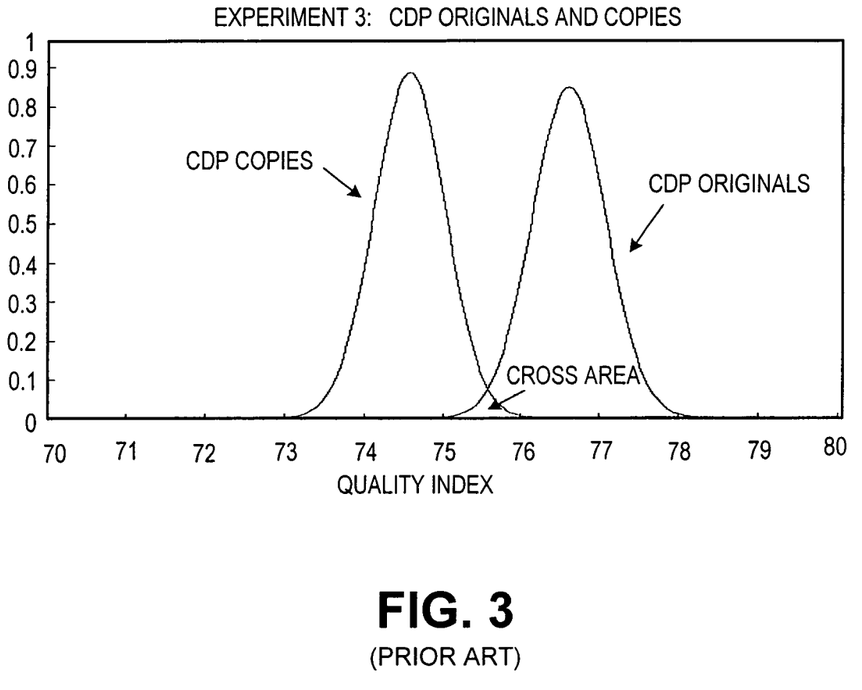
FIG. 3 is a graph showing results of a copy detection test using a prior art copy detection system.

Referring to FIG. 3, a graph 300 showing results of a copy detection test using a prior art copy detection system is provided. In the experimental results depicted, results for CDP originals are graphed with CDP copies. As can be appreciated from the graph 300, there is an overlap or cross are of the results graphed such that there is a certain region that corresponds to an undetermined copy detection determination. The system would provide a false positive result or a false negative result even if the threshold were optimally set.

Figure 4:
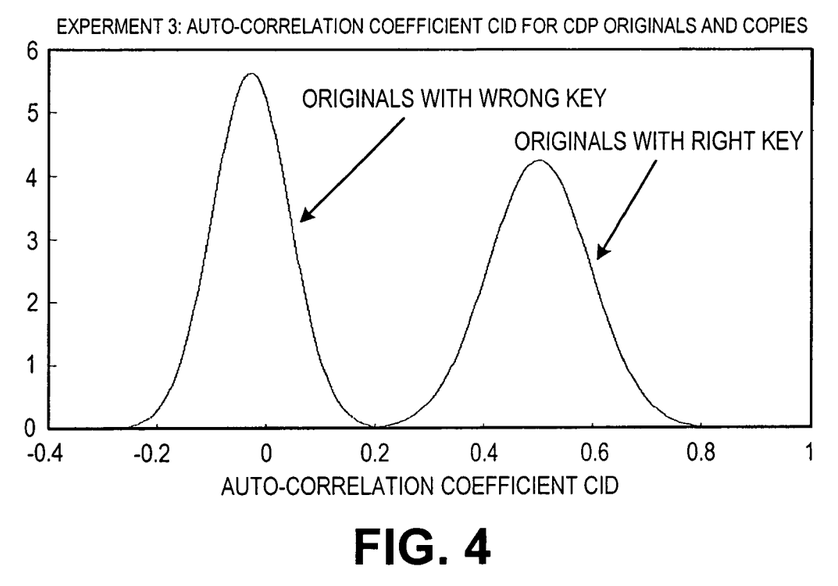
FIG. 4 is a graph showing results of a copy detection test using an illustrative embodiment of the present application to provide an identification determination using auto-correlation of a captured CDP and a registered expected CDP.

Referring to FIG. 4, a graph 400 showing results of a copy detection test using an embodiment of the present application to provide an identification determination using auto-correlation of a captured CDP and a registered expected CDP is provided. As can be appreciated, there is no or almost no cross area of the results for the originals with the correct key and the originals with the wrong key. Accordingly, it is highly likely that such a system with a proper threshold setting will make an accurate and precise identification determination to ensure that the CDP captured utilized the expected key when created. For example, a threshold of CID equal to 0.2 would likely provide optimal results. If the test value were determined to be 0.1, the identification test would fail. The thresholds may be set empirically.

Figure 5:
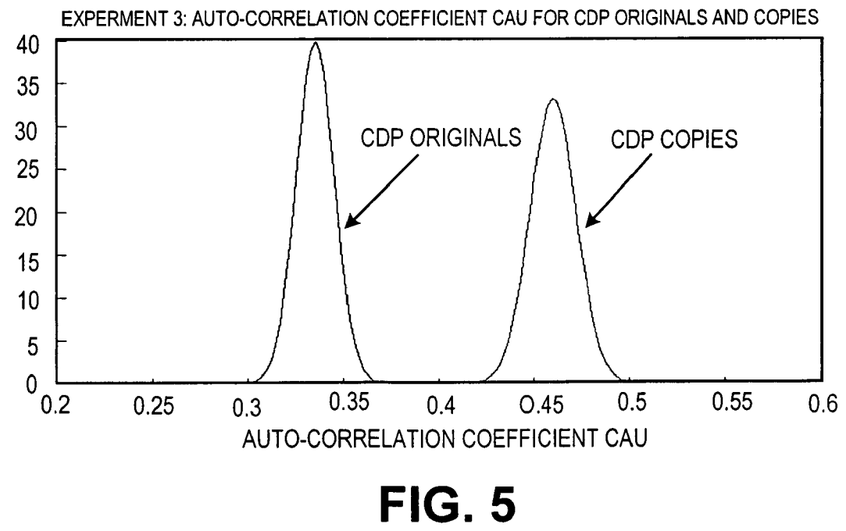
FIG. 5 is a graph showing results of a copy detection test using an illustrative embodiment of the present application to provide an authentication determination using auto-correlation of an unregistered captured CDP.

Referring to FIG. 5, a graph 500 showing results of a copy detection test using an embodiment of the present application to provide an authentication determination using auto-correlation of an unregistered captured CDP is provided. As can be appreciated, there is no cross area of the results for the CDP of copies with the results for the CDP of originals. Accordingly, it is highly likely that such a system with a proper threshold setting will make an accurate and precise authentication determination to ensure that the CDP captured was captured from the original version of the document and not a copy. For example, a threshold of CAU equal to slightly less than 0.4 would likely provide optimal results. If the test value were determined to be 0.45, the authentication test would fail.

For simplicity, the embodiments described above utilize the simplest 2-variable first order correlation. According to another embodiment of the present application applicable to any of the embodiments described herein, more complicated multiple-variable and higher order correlation (with variable normalization at the orders below) can be used for even better results. Certain experiments resulted in slightly better results when 4-variable first order correlation was used. Experiments were run using both 32 and 256 gray level systems.

Additional examples are described here to illustrate a comparison of the methods and systems of the embodiments of the present application with a commercially available CDP system.

A test run of 5 batches of 35 CDPs for each system (1 key per batch, 35 CDPs per key) were printed with a Mitsubishi P91D printer (gamma 1) on Mitsubishi K61S-ce/KP61S-cd standard type thermal paper. Batches were printed in a 7 rows by 5 columns table. Each batch was scanned 5 times with a Microtek ArtixScan 1800f scanner at 1300 ppi. We only kept the high quality scanned batch with the highest quality index for each key (high quality scan). Those were scanned with Canon at 260 ppi 5 times and kept for comparison (original batch). The high quality scanned batch was reprinted with HP 7550 PHOTOSMART inkjet printer on HP Premium glossy photo paper with best photo quality and highest resolution (4800'1200 dpi). This reprinted high-scan batch was scanned with Canon at 260 ppi 5 times (copy batch). The commercial system quality indexes of copy and original batches was computed.

TABLE 2

| | | Commercial System (Quality Index) | | | | Copy Detection with correlations (Authentication Index) | | | |
|---|---|---|---|---|---|---|---|---|---|
| Key | | Original | Copy | Cross Area % | IC | Original | Copy | Cross Area % | IC |
| 1 | Mean | 81.54 | 80.54 | 18.14 | 1.88 | 0.243 | 0.335 | 1.11e−3 | 5.88 |
| | Std | 0.41 | 0.34 | | | 0.007 | 0.014 | | |
| 2 | Mean | 81.61 | 80.48 | 6.77 | 2.56 | 0.227 | 0.318 | 5.12e−4 | 6.16 |
| | Std | 0.35 | 0.27 | | | 0.007 | 0.013 | | |
| 3 | Mean | 81.58 | 80.46 | 8.49 | 2.44 | 0.245 | 0.324 | 3.28e−2 | 5.06 |

TABLE 2-continued

| | | Commercial System (Quality Index) | | | | Copy Detection with correlations (Authentication Index) | | | |
|---|---|---|---|---|---|---|---|---|---|
| Key | | Original | Copy | Cross Area % | IC | Original | Copy | Cross Area % | IC |
| | Std | 0.32 | 0.33 | | | 0.012 | 0.010 | | |
| 4 | Mean | 81.45 | 80.31 | 10.83 | 2.27 | 0.231 | 0.318 | 1.35e−3 | 6.12 |
| | Std | 0.35 | 0.36 | | | 0.011 | 0.009 | | |
| 5 | Mean | 81.84 | 80.62 | 8.12 | 2.46 | 0.227 | 0.313 | 4.21e−5 | 7.14 |
| | Std | 0.37 | 0.33 | | | 0.009 | 0.008 | | |
| 1T | Mean | 81.54 | 78.42 | 1.71e−2 | 5.32 | 0.243 | 0.416 | 2.04e−6 | 6.92 |
| | Std | 0.41 | 0.42 | | | 0.007 | 0.024 | | |

The identification and authentication indexes of the system according to the present application of copy and original batches were computed and compared with the commercial system quality index. A correlation coefficient between the present embodiment authentication index and commercial system quality index was computed to assess the independence of both methods. In order to show that the results are not key dependent, five keys were used to generate five different CDPs and are: 1234556789, 1234598765, 1928374655, iu78f$20#Y and y!j@8k9m7a.

In experiment, CDP of both 256 and 32 gray levels were produced and tested. The technical details on PB identification and authentication indices can be found in the corresponding PB invention disclosure.

As shown in Table 2, a 256 gray level test was run using 2-point correlation. A test for Key 1 was also run using thermal paper (1T).

As shown in Table 3, a 256 gray level test was run using 4-point correlation and provided better results. A test for Key 1 was also run using thermal paper (1T).

TABLE 3

| | | Commercial System (Quality Index) | | | Copy Detection with correlations (Authentication Index) | | |
|---|---|---|---|---|---|---|---|
| Key | | Original | Copy | Cross Area % | Original | Copy | Cross Area % |
| 1 | Mean | 81.54 | 80.54 | 18.14 | 0.214 | 0.291 | 3.64e−6 |
| | Std | 0.41 | 0.34 | | 0.005 | 0.009 | |
| 2 | Mean | 81.61 | 80.48 | 6.77 | 0.216 | 0.290 | 1.34e−3 |
| | Std | 0.35 | 0.27 | | 0.008 | 0.009 | |
| 3 | Mean | 81.58 | 80.46 | 8.49 | 0.225 | 0.292 | 2.54e−5 |
| | Std | 0.32 | 0.33 | | 0.007 | 0.006 | |
| 4 | Mean | 81.45 | 80.31 | 10.83 | 0.205 | 0.290 | 0.00 |
| | Std | 0.35 | 0.36 | | 0.005 | 0.004 | |
| 5 | Mean | 81.84 | 80.62 | 8.12 | 0.224 | 0.307 | 1.71e−8 |
| | Std | 0.37 | 0.33 | | 0.007 | 0.006 | |
| 1T | Mean | 81.54 | 78.42 | 1.71e−2 | 0.214 | 0.360 | 1.59e−6 |
| | Std | 0.41 | 0.42 | | 0.005 | 0.021 | |

For simplicity and so that the expected best correlation length was one pixel, the embodiments described above utilized an official printer and an official scanner operating at the same resolution. According to another embodiment of the present application applicable to any of the embodiments described herein, the official printer and the official scanner may be operated at different resolutions. In such an example, the correlation length may be fine tuned as can be understood by one of skill in the art. Furthermore, according to yet another embodiment of the present application applicable to any of the embodiments described herein, the CDP could be an RGB image or an image in any other color space.

In an alternative applicable to any of the embodiments herein, the authentication correlation utilizes an optimal correlation length based upon the scan resolution. For example, in a base case, the print resolution and the scan resolution are the same, e.g. 400 dpi. In that case, the optimal correlation length is one which is the ratio of the scanner resolution over the printer resolution. In that case, the pixel shifts used in the one or more transformations for correlation would be one pixel shifts. Alternatively, the scanner resolution may be twice the printer resolution, e.g. 800 dpi. In such an alternative case, the optimal correlation length is set to the scanner resolution over the printer resolution or 2. Accordingly, the one or more transformations used for authentication correlation would include 2 pixel shifts.

In yet another alternative applicable to any of the embodiments herein, the following multipoint correlation is used. Based upon computing the volume of a parallelogram in dimension n (if we are using an n-point correlation) spanned by the n vectorized images normalized to length 1 with respect to a given norm. If the vectors are independent, they will be on average close to orthogonal and the volume of the parallelogram will be close to 1. If on the contrary, the vectors are independent, they will be close to each other and the volume will be closer to 0.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A computer implemented method for determining if a document is an original version using a processor comprising:

receiving at the processor a captured copy detection pattern (CDP) from a document to be verified; obtaining an expected CDP using the processor;

manipulating the expected CDP to create a manipulated expected CDP using the processor;

wherein manipulating the expected CDP includes registering the expected CDP to the captured CDP; and wherein registering the expected CDP to the captured CDP comprises spatially transforming the expected CDP; and performing a first correlation using the captured CDP and the manipulated expected CDP to determine a first test parameter using the processor.

2. The method according to claim 1, further comprising using the processor in:

performing at least one transformation on the captured CDP data to create at least one transformed captured CDP; and performing a second correlation using the captured CDP and the at least one transformed CDP to determine a second test parameter.

3. The method according to claim 1, further comprising using the processor in:

receiving a captured copy of data from the document that is to be protected.

4. The method according to claim 2, wherein the first parameter is an identification index and the second parameter is an authentication index.

5. The method according to claim 2, wherein the at least one transformation includes a 1 pixel shift transformation.

6. The method according to claim 5, wherein the at least one transformation includes a plurality of transformations including a plurality of 1 pixel shift transformations each in a different direction.

7. The method according to claim 2, wherein the at least one transformation includes an n-pixel shift, wherein n is determined as the optimal correlation length using the printer resolution and the scanner resolution.

8. The method according to claim 1, wherein the expected CDP data is obtained from a trusted third party.

9. The method according to claim 1, wherein the expected CDP data is obtained by reconstituting the expected CDP data from an appropriate key.

10. The method according to claim 3, wherein the expected CDP data is obtained by reconstituting the expected CDP data using the captured copy of data from the document that is to be protected.

11. The method according to claim 1, further comprising using the processor in:

using the first parameter and a first threshold to determine if the document passed an identification test.

12. The method according to claim 2, further comprising using the processor in:

using the second parameter and a second threshold to determine if the document passed an authentication test.

13. The method according to claim 12, further comprising using the processor in:

determining that the document is an authentic original copy if the captured CDP passed the identification test and the authentication test.

14. The method according to claim 1, wherein the document is a portion of a document that includes protected data.

15. A computing system for determining if a document is an original version comprising:

a processor operatively connected to a program memory;

the program memory configured with instructions for operating the processor to:

receive a captured copy detection pattern (CDP) from a document to be verified;

obtain an expected CDP;

manipulate the expected CDP to create a manipulated expected CDP;

register the expected CDP to the captured CDP by spatially transforming the expected CDP; and perform a first correlation using the captured CDP and the manipulated expected CDP to determine a first test parameter.

16. An article of manufacture comprising:

a computer-readable medium having computer-readable program code stored thereon for controlling a computer to determine if a document is an original version, said computer-readable program code including:

program code for receiving a captured copy detection pattern (CDP) from a document to be verified;

program code for obtaining an expected CDP;

program code for manipulating the expected CDP to create a manipulated expected CDP;

program code for registering the expected CDP to the captured CDP by spatially transforming the expected CDP; and program code for performing a first correlation using the captured CDP and the manipulated expected CDP to determine a first test parameter.

* * * * *